W. C. MARTIN.
PNEUMATIC TIRE AND ITS MANUFACTURE.
APPLICATION FILED APR. 11, 1919.
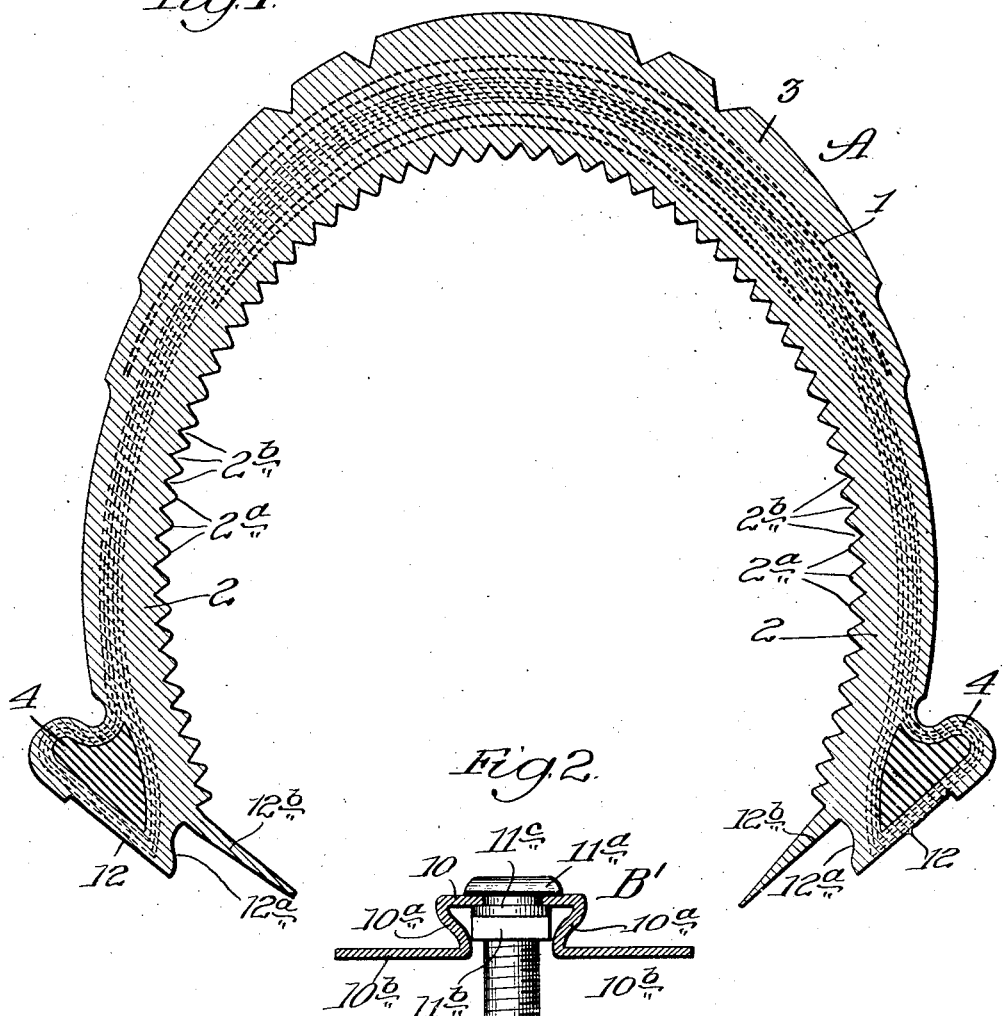
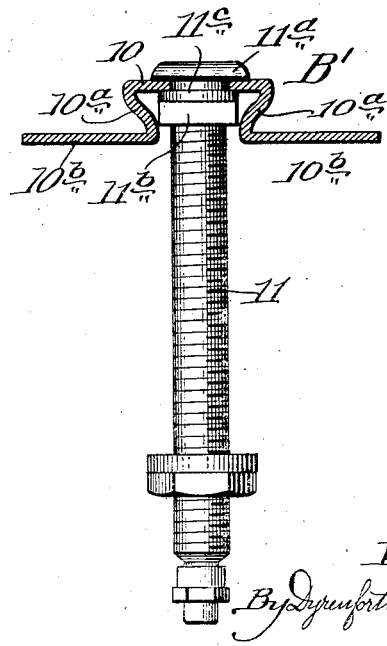

W. C. MARTIN.
PNEUMATIC TIRE AND ITS MANUFACTURE.
APPLICATION FILED APR. 11, 1919.
1,412,535. Patented Apr. 11, 1922.
2 SHEETS—SHEET 2.
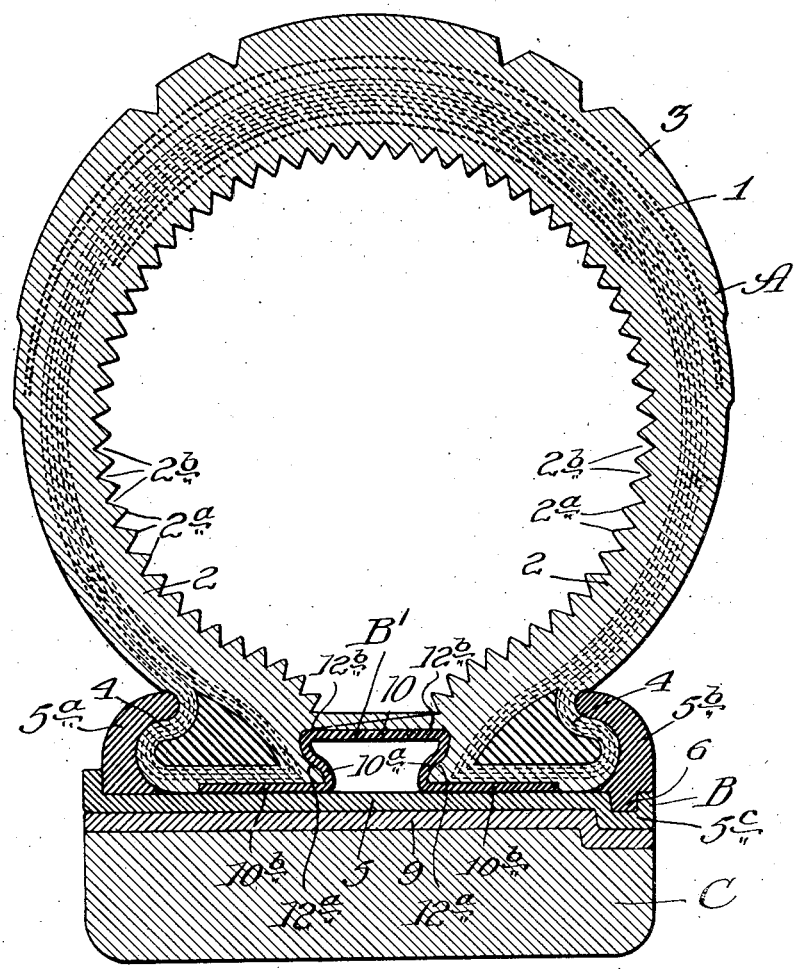
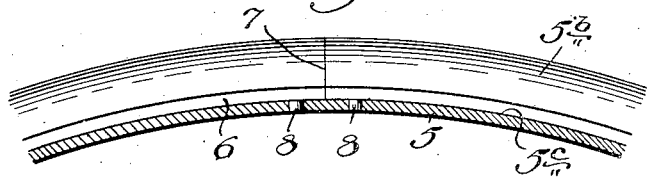
Witnesses:
Inventor:
William C. Martin

UNITED STATES PATENT OFFICE.

WILLIAM C. MARTIN, OF CHICAGO, ILLINOIS.

PNEUMATIC TIRE AND ITS MANUFACTURE.

1,412,535. Specification of Letters Patent. Patented Apr. 11, 1922.

Application filed April 11, 1919. Serial No. 289,256.

*To all whom it may concern:*

Be it known that I, WILLIAM C. MARTIN, a citizen of the United States, residing at Chicago, in the county of Cook and State of Illinois, have invented a new and useful Improvement in Pneumatic Tires and Their Manufacture, of which the following is a specification.

This invention relates particularly to tubeless pneumatic tires and the manufacture thereof, and the primary object is to provide a tubeless pneumatic tire, which is adapted for use in connection with the wheels of motor-vehicles, and the improved method of manufacturing same.

The invention is illustrated in its preferred embodiment in the accompanying drawings, in which—

Fig. 1 represents a cross-sectional view of the improved tire in the form in which it is applied in the manufacturing process; Fig. 2, a transverse sectional view of an annular inner tire-seat and clamping member employed; Fig. 3, a cross-sectional view showing the tire applied to a rim mounted on the felly of a wheel; and Fig. 4, a broken sectional view illustrating the manner in which a detachable flange of the tire-securing rim is applied.

In the construction illustrated, A represents the improved tire; B, a tire-securing rim; and C, a felly of a wheel upon which the rim and tire are mounted.

The tire A is formed of a suitable rubber compound and provided with reinforcing fabric 1, as many plies of fabric or canvas being used as good practice requires, depending upon the weight to be carried by the tire. In forming and vulcanizing the tire, I purposely form it so that the attaching flanges are widely separated, as shown in Fig. 1. That is, the tire is substantially of U-form cross-section. When it is molded and vulcanized, inside the fabric, the tire is provided with a thick lining 2 of soft rubber compound of good quality, any suitable compound of self-sealing character being employed. Such compounds have been manufactured and on the market for many years, and any suitable compound may be selected. Preferably, the inner lining of the tire is so formed as to provide inwardly projecting V-form ribs $2^a$ separated by V-form notches or recesses $2^b$, thus giving a corrugated effect. These corrugations run circumferentially, that is, around the wheel. The outer layer of rubber 3 may likewise be of any suitable rubber compound, and may be of the same compound as the inner layer.

The tire is formed with attaching flanges 4, which may be stiffened in any desired manner. These attaching flanges, or beads, 4, are specially shaped for the purpose of this invention.

The rim B comprises the main felly-embracing steel band 5 and tire-securing flanges $5^a$ and $5^b$. The flange $5^a$ may be welded to the member 5, or otherwise suitably secured thereto. In other words, the flange $5^a$ may be virtually integral with the member 5. The flange $5^b$ is detachable. In the illustration given, the flange $5^b$ is in the form of a split ring having a tenon 6 which is received in a circumferential socket, or recess, $5^c$, with which the member 5 is provided near one edge. In Fig. 4, the ends of the split ring $5^b$ are indicated at 7; and the split ring is shown provided with locking lugs 8 which are received by recesses, or perforations, in the metal at the base of the circumferential recess $5^c$.

The rim B as described is shown forced or shrunk upon a steel band 9 which is fitted upon the felly.

Mounted upon the main portion 5 of the rim B is an inner combined tire-seat and clamp B′, which may, if desired, be regarded as a part of the sectionally constructed tire-attaching rim. The member B′ is annular, that is, it extends entirely about the wheel. It preferably is split at the plane of the line 7 shown in Fig. 4. The member B′ is provided with a central raised portion, or wide bead, 10, having the curved undercut sides $10^a$, from the base portion of which extend the lateral flanges $10^b$ which embrace the portion 5 of the rim B. The intermediate portion 10 of the member B is fitted with a nipple 11, which extends through the felly of the wheel. This may be applied in any suitable manner. It is desirable, however, that the edge-portion of the nipple shall be so connected with the member B′ as to afford an air-tight joint. In the illustration, the nipple is shown provided with a flange 11ª which bears against the outer circumferential surface of the part 10 of the member B', and a locknut 11ᵇ and washer 11ᶜ are employed as a clamping means, whereby the metal of the portion 10 is clamped between the flange 11ª and the lock-nut. Any suitable expedient for assembling the parts may be adopted.

The attaching flanges, or beads, 4, of the tire are provided with recesses 12 adapted to rest on the flanges 10ᵇ of the member B', and the inner edges of the beads 4 are provided with curved surfaces 12ª which are adapted to fit against the curved or tortuous walls 10ª of the bead 10. Also, the inner lining 2 of the tire is provided with annular projecting tapering flanges or flaps, 12ᵇ, adapted to bear on the outer circumferential surface of the bead 10 of the inner clamping member B'.

From the description given, it will be understood that when the parts are assembled as shown in Fig. 3, the inner self-sealing rubber wall of the tire will be placed under compression due to the contracting of the tire when it is placed upon the wheel and closed. In applying the tire, the attaching flanges, or beads, 4, of the tire are placed under heavy compression between the flanges 5ª and 5ᵇ of the rim B and the inner clamping member B'. Inasmuch as the attaching portions of the tire overlie the flanges 10ᵇ and bear strongly against the tortuous side walls 10ª of the member B', and the elastic soft rubber lining of the tire also has overlapping flanges or flaps 12ᵇ bearing on the outer wall of the raised portion 10 of the member B' it will be understood that there are provided tortuous sealing surfaces of large area which will effectually prevent the escape of compressed air from the tire.

As has been stated, the rubber compound employed, especially for the thick inner wall of the tire, is of a self-sealing character; and because this inner wall is placed under compression in applying the tire, the self-sealing quality is greatly enhanced. In case of a puncture, as by a nail or tack, the tire will seal itself when the nail or tack is removed. The corrugations 2ª which form a part of the inner wall of the tire provide, in effect, a surplus of rubber which aids in the self-sealing function. These corrugations also tend to stiffen the tire in a direction about the circumference of the wheel and tend to prevent side swaying. They also enable a wall of suitable thickness to be provided, without objectionally stiffening the tire against application to the wheel and without unduly stiffening the tire against resiliency under road-impact.

Any suitable form of rim may be employed as a substitute for the rim B.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:

1. The combination of a rim provided with tire-securing flanges, a rigid inner annular tire clamping member having lateral walls adapted to engage the inner edge-portions of the beads of the tire and having flanges extending outwardly from said walls, and a tire having attaching flanges resting upon the flanges of said inner clamping member and bearing against the lateral walls of said inner clamping member, the flanges of said tire being tightly clamped in position and having soft rubber portions engaging said inner clamping member.

2. The combination of a rim comprising a main felly-embracing portion and tire-engaging flanges, said rim being sectionally constructed; a rigid annular inner tire-clamping member encircling the felly-embracing portion of said rim and having a raised central portion and lateral undercut walls forming the sides of said raised central portion, and flanges extending outwardly from the base of the raised central portion; and a tire equipped with beads having soft rubber portions engaging the raised portion of said inner clamping member, said beads bearing on the flanges of said inner clamping member, said tire having an inner wall of self-sealing rubber compound.

3. The combination of a rim having tire securing flanges, a rigid inner annular tire-clamping member having a raised central portion and lateral undercut walls; and a tire equipped with beads having soft rubber portions engaging the undercut walls of said inner clamping member and overlapping soft rubber flaps engaging the upper surface of the raised portion of the inner clamping member.

4. In means of the character set forth, the combination of a rim provided with tire-securing flanges; an inner tire-clamping member mounted on said rim; and a tire having an inner relatively thick wall of self-sealing rubber compound and having resilient flanges clamped between the tire-securing flanges of said rim and said inner clamping member, said inner wall of self-sealing rubber compound being normally under compression due to closing the tire in applying it to said rim.

5. In means of the character set forth, the combination of a rim equipped with tire-securing flanges; and a tire provided with resilient flanges held under compression by said tire-securing flanges of said rim, said tire being provided with reinforcing material and having a relatively thick inner wall of self-sealing rubber compound, said inner wall being normally under compression due to closing the tire in applying it to the rim.

6. The method of producing a self-sealing tire which comprises molding and vulcanizing a tire provided with suitable reinforcement and having a thick inner wall of self-sealing rubber compound, the molding and vulcanizing being effected while the attaching flanges of the tire are widely separated, whereby the inner wall will be placed under compression when the tire is contracted by forcing the flanges to the operative position in the rim.

WILLIAM C. MARTIN.